Sept. 26, 1933. M. J. JØRGENSEN Re. 18,959

HEEL FOR BOOTS OR SHOES

Original Filed May 24, 1930

Martin Johannes Jørgensen
INVENTOR

BY Frank D. Wentworth
ATTORNEY.

Reissued Sept. 26, 1933 Re. 18,959

UNITED STATES PATENT OFFICE 18,959

HEEL FOR BOOTS OR SHOES

Martin Johannes Jørgensen, Frederiksberg, near Copenhagen, Denmark

Original No. 1,832,463, dated November 17, 1931, Serial No. 455,175, filed May 24, 1930, and in Czechoslovakia August 30, 1927. Application for reissue filed June 23, 1933. Serial No. 677,221

7 Claims. (Cl. 36—36)

The invention relates to heels for boots or shoes, and more particularly to a heel of this type in which the lower or wear lift may be readily removed and replaced.

Detachable heels known prior to my invention have not proven to be satisfactory because of the employment therein of mechanical devices for attaching the lower lift to the main heel body. Such mechanical devices not only make the production of the heel expensive, but require a nicety in the adjustment of parts which makes the production of the lower or wear lift for replacement purposes difficult.

With the above conditions in mind, I have provided a heel of the type to which the invention relates wherein the lower or wear lift of the heel is provided with studs that will frictionally engage sockets formed in the main body of the heel, said studs being of a length not only to afford the desired area of frictional contact between them and the heel sockets, but to minimize likelihood of the accidental displacement of the wear lift from lateral stresses thereon while a shoe is being worn.

The friction studs are permanently connected with the wear lift and extend at substantially right angles to the plane of its wear surface, and these studs have a friction fit with the walls of the co-operating sockets sufficiently tight to require the provision of means carried by the heel proper for effecting a removal of the lift when it becomes necessary to replace same.

The invention consists primarily in a heel for boots or shoes embodying therein a heel block having a plurality of sockets therein, an ejector member carried by said heel block having a screw threaded connection therewith, said sockets being symmetrically grouped in relation to said ejector, a wear lift engageable by said ejector member, and a plurality of studs permanently secured thereto and adapted to enter and frictionally engage said sockets respectively; and in such other novel characteristics as are hereinafter set forth and described and more particularly pointed out in the claims hereto appended.

Referring to the drawing.

Like numerals refer to like parts throughout the several views.

Figure 1:
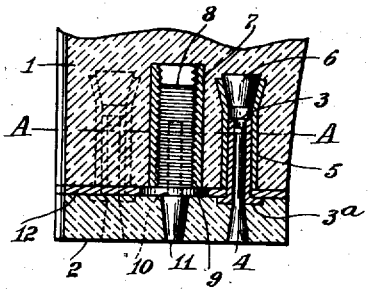
Fig. 1 is a sectional view of the lower portion of the wooden heel block of a woman's shoe and of the wear tread therefor, said block and said wear tread embodying one embodiment of the invention, and said section being on the line B—B of Fig. 2.
Figure 2:
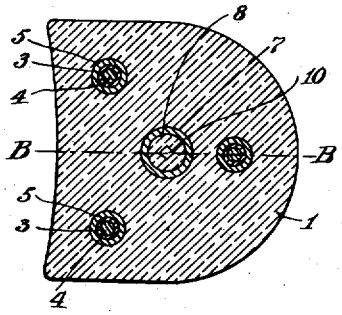
Fig. 2 is a section on the line A—A of Fig. 1.

Referring to the drawing, the heel block is shown at 1. This block in women's shoes is usually made of hard wood while in men's shoes, it is made of leather. A wood block is shown in Figs. 1 and 2 of the drawing. The lower or tread lift is shown at 2 and may be made of either leather or soft vulcanized rubber.

In a heel embodying the invention, the heel block 1 and the lift 2 are provided with co-operating means facilitating the attachment of the lift to the heel block and its separation therefrom. This attachment means comprises a plurality of studs permanently secured to the heel lift, and a plurality of sockets with which the heel block is provided within which sockets the studs have a close driving fit so that by frictional engagement of the studs with the walls of the sockets, the lift is firmly secured in relation to the heel block.

The exact construction of the studs and the manner of forming the sockets may be widely varied.

Figure 3:
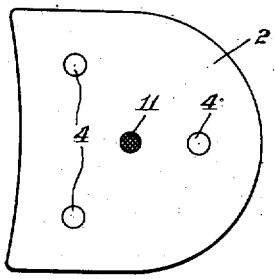
Fig. 3 is a bottom plan view of the wear lift.

Referring to Figs. 1 to 3 of the drawing, each of said studs comprises a sleeve 3, having a flanged end 3*a*. The sleeve is secured to the lift by means of a pin 4 having a tapered end embedded in the material of the lift and a cylindrical end having a close driving fit within the sleeve 3.

As heretofore stated, a plurality of such studs are used and in the manufacture of the lifts, the studs are similarly located, as to each lift, so as to make different lifts interchangeable in order to facilitate repairs to any heel by the removal of the worn lift and the substitution of a new lift therefor.

Figure 4:
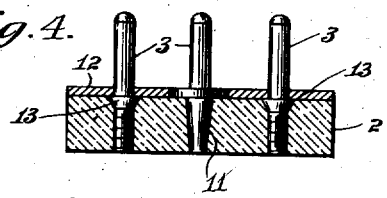
Figs. 4 and 5 are a sectional and bottom plan view of a modified form of wear lift especially adapted for use with leather lifts, Fig. 4 being a section on the line E—E of Fig. 5.
Figure 5:
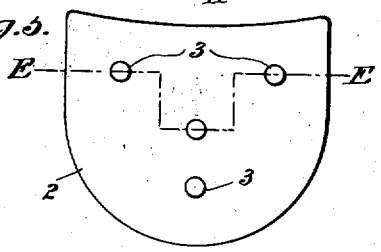

In the form of the invention shown in Figs. 4 and 5, the studs 3 are made of a single piece of metal having a screw threaded end by means of which the stud may be attached to a leather lift, the stud having adjacent the top of said screw thread, a tapered flange 13 for limiting the extent of penetration of the stud within the material of the lift.

Figure 6:
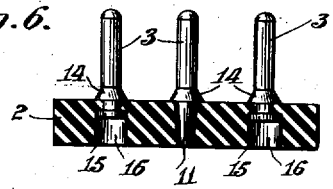
Figs. 6 and 7 are a sectional and bottom plan view of a still further modification of the wear lift adapted to rubber heels, Fig. 6 being a section on the line G—G of Fig. 7.
Figure 7:
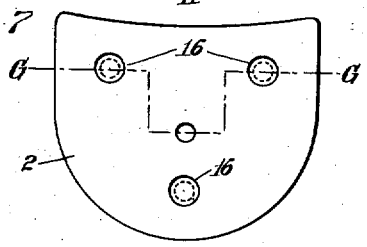

In the form of the invention shown in Figs. 6 and 7, each plug 3 is provided with a conical circular flange 14 adjacent one end thereof and an enlarged head 15 spaced from said flange so as to provide an annular channel for the reception of a rim of soft vulcanized rubber at the top of an opening extending through and presented downwardly of a soft vulcanized rubber lift. The opening in the lift is of a diameter to permit the passage of the flange 14 and head 15 therethrough, the taper of the flange being presented upwardly to facilitate the insertion of the plug and the spreading of the rim in passing the flange through a small opening within the rim above referred to.

Figure 8:
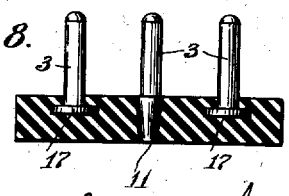
Fig. 8 is a sectional view of a still further modification of a wear lift adapted for use with rubber heels.

In the form of the invention shown in Fig. 8, the studs 3 like those shown in Figs. 4 to 7 are made of a single piece of metal, but are provided with an enlarged head 17 which is moulded within the rubber of the lift when making said lift.

The number and arrangement of studs will vary with the size or character of the shoe. In a so-called French heel having a very small tread area, a fewer number of studs are required than with a Cuban heel or a heel upon a man's shoe.

Referring to Figs. 6 and 7, the opening through which the studs are passed in securing them in relation to the lift are filled with a soft vulcanized rubber or other plug 16, after the studs have been so attached.

The heel block 1 is provided with a plurality of sockets corresponding in number and location with the number and location of the studs 3 and of a diameter to ensure a close driving fit of said studs therewith. As shown more particularly in Figs. 1 and 2 of the drawing, these sockets are provided with a lining bushing 5 having a driving fit within openings provided in the heel block for the reception thereof. The bushings 5 are provided mainly for the purpose of reinforcing the material of the heel block to prevent possible mutilation thereof when driving the studs in the sockets. Where the material of the heel block is such as to minimize likelihood of such mutilation, said bushings may be dispensed with.

The bushings are secured in position within the sockets by means of expanding wedges 6 seated in the bottom of the sockets and adapted to enter and spread the material at the top of the bushings.

Irrespective of the details in the formation of the sockets and the construction of the studs, the lower or tread lift is applied to the heel block by merely forcing the studs within the sockets, it being possible to do this by hand. When the studs are once so inserted, the frictional engagement between same and the walls of the socket will prevent the separation of the lift from the block. The length of the studs and the depth of the sockets and the diameters of each are such as to afford an ample area of contact between the studs and the walls of the sockets to secure this result. In actual practice, the separation of the lift from the heel block is extremely difficult, and the possibility of accidental displacement of the lift is negligible.

To permit the removal of a worn lift when making repairs to the heel of a shoe, I provide the heel block 1, substantially centrally thereof, with an ejector member having a screw threaded connection with a socket formed in the material of the heel block.

In the form of the invention shown in Figs. 1 and 2, the socket for the ejector member is provided with a reinforced lining consisting of an interiorly screw threaded bushing 7, and the ejector member comprises a screw 8, the threads of which cooperate with the threads within said bushing 7. The screw 8 is provided with an enlarged head 9, which may project beyond the lower face of the heel block as shown in Fig. 1 or may fit into a recess in the material of said heel block so as to bring the head within the plane of the bottom of said block.

The head 9 of the screw 8 is provided with a wrench opening 10 or other means by which the screw may be turned to withdraw it from the socket in a manner to force the lift 2 away from the heel block or to so position the screw as to permit the attachment of a lift to the heel block.

To facilitate the insertion of a wrench or other hand tool for the purpose of turning the screw, I provide a lift with an opening extending therethrough, this opening being of smaller diameter than the head 9 of the screw 8 so as to afford a proper bearing area between this head and the inner face of the lift.

To prevent moisture or dirt filling the opening through the lift, I normally close it by means of a plug 11 of rubber or other material which may be readily removed with a pointed implement.

To exclude moisture and dirt from between the bottom of the heel block and the lift and prevent adherence of the lift to the heel block, I preferably interpose a disk 12 of celluloid or other suitable material between the lift and the bottom of the heel block. This disk is provided with suitable openings for the passage of the studs 3 therethrough and to permit access to the wrench socket 10 for the purpose of turning said screw in order to separate the lift from the block.

The disk 12 is preferably used with leather lifts, its use with soft vulcanized rubber lifts being unnecessary.

It is needless to say that the disk 12 must correspond in contour with the bottom of the heel block to which the lift is designed to be attached.

In locating the various sockets and studs, they must be symmetrically arranged in relation to each other and to, and upon opposite sides of, the ejector means.

In manufacturing heels embodying the invention, the studs are permanently secured to the lift in a desired relation, and the sockets are formed in the heel blocks in a corresponding position.

When it is desired to attach a lift to a heel block, it is merely necessary to turn the screw 8 so as to draw it inwardly of the heel block to a point where it will not interfere with a desired close contact of the upper face of the lift throughout the lower face of the heel block, or where a disk 12 is used, the entire upper face of this disk with the entire lower face of said block. When the ejector means or the screw 8 is in this position, it is merely necessary to insert the studs in their co-operating sockets and force the lift by hand into contact with the heel block.

The plug 11 is inserted in the hole through the lift as an operation in its manufacture.

When it is desired to replace a worn lift with a new lift, it is merely necessary to remove the plug 11 and by inserting a hand wrench or other implement through the opening, reversely turn the screw in a manner to withdraw it from its socket, engagement of the head 9 of the screw with the inner wall of the inner face of the lift or of the disk 12, forcing said lift away from the heel block and withdrawing the studs from the sockets with which they co-operate to an extent to permit the fingers to grasp the edges of the lift and complete the withdrawal of the studs. In the event of unusual binding of the studs, the slight separation of parts permits the insertion of a hand tool for developing sufficient leverage to complete the withdrawal of the studs from their co-operating sockets.

By the foregoing construction, the use of interlocking mechanisms, springs and other devices for securing the lift upon the heel block is unnecessary, and convenient interchangeability of lifts and heel blocks is made possible merely by accuracy in the location of the co-operating studs and sockets when producing the parts of the heel in the factory.

It is not my intention to limit the invention to the precise details of construction shown in the accompanying drawing, it being apparent that such may be varied without departing from the spirit and scope of the invention.

Having described the invention, what I claim as new and desire to have protected by Letters Patent, is:—

1. A heel for boots or shoes embodying therein a heel block having a plurality of sockets therein, an ejector member carried by said heel block having a screw threaded connection therewith, said sockets being symmetrically grouped in relation to said ejector, a wear lift engageable by said ejector member, and a plurality of studs permanently secured thereto and adapted to enter and frictionally engage said sockets respectively.

2. A heel for boots or shoes embodying therein a heel block having a plurality of sockets therein, a wear lift, a plurality of studs firmly secured thereto adapted to enter and frictionally engage said sockets respectively, said heel block having a screw threaded socket intermediate said other sockets, and an ejector screw co-operating with said screw threaded socket and engaging said lift, whereby the withdrawal of said screw from its socket will force said lift away from the heel block and the studs from the sockets with which they co-operate, said lift having an opening therethrough permitting the passage of an implement through the lift for actuating said screw.

3. A heel for boots or shoes embodying therein a heel block having a plurality of sockets therein, an ejector member carried by said heel block having a screw threaded connection therewith, said sockets being symmetrically grouped in relation to said ejector, a wear lift engageable by said ejector member, a plurality of studs permanently secured thereto and adapted to enter and frictionally engage said sockets respectively, and a disk interposed between said lift and said heel block, said disk having openings therethrough for the passage of said studs.

4. A heel for boots or shoes embodying therein a heel block having a plurality of sockets therein, a wear lift, a plurality of studs firmly secured thereto adapted to enter and frictionally engage said sockets respectively, said heel block having a screw threaded socket intermediate said other sockets, an ejector screw co-operating with said screw threaded socket and engaging said lift, whereby the withdrawal of said screw from its socket will force said lift away from the heel block and the studs from the sockets with which they co-operate, said lift having an opening therethrough permitting the passage of an implement through the lift for actuating said screw, and a disk interposed between said lift and said heel block, said disk having openings therethrough for the passage of said studs.

5. A heel for boots or shoes embodying therein a heel block having a plurality of sockets therein, a wear lift, a plurality of studs firmly secured thereto adapted to enter and frictionally engage said sockets respectively, said heel block having a screw threaded socket intermediate said other sockets, an ejector screw co-operating with said screw threaded socket and engaging said lift, whereby the withdrawal of said screw from its socket will force said lift away from the heel block and the studs from the sockets with which they co-operate, said lift having an opening therethrough permitting the passage of an implement through the lift for actuating said screw, and a removable plug closing the opening through said lift.

6. A heel for boots or shoes embodying therein a rigid heel block having a plurality of sockets therein, smooth metal bushings lining said sockets, a wear lift, a plurality of projecting studs secured thereto, said heel block having a centrally located socket therein, an interiorly screw threaded bushing lining said socket, and a screw co-operating with said screw threaded bushing and adapted to be actuated from the outer side of said lift, said screw being adapted to engage said lift, whereby when it is unscrewed, it will force said lift away from said heel block.

7. A heel for boots or shoes embodying therein a rigid heel block having a plurality of sockets therein, smooth metal bushings lining said sockets, expanding wedges seated within said sockets and operative to spread said bushings to secure them to said heel block, a wear lift, a plurality of projecting studs secured thereto, said heel block having a centrally located socket therein, an interiorly screw threaded bushing lining said socket, and a screw co-operating with said screw threaded bushing and adapted to be actuated from the outer side of said lift, said screw being adapted to engage said lift, whereby when it is unscrewed, it will force said lift away from said heel block.

MARTIN JOHANNES JØRGENSEN.